(12) United States Patent
Bagley (10) Patent No.: US 11,280,400 B2
(45) Date of Patent: Mar. 22, 2022

(54) TRANSMISSION SHIFTER WITH IMPROVED FEEL POSITIONER

(71) Applicant: GHSP, Inc., Grand Haven, MI (US)

(72) Inventor: John Thomas Bagley, Grand Haven, MI (US)

(73) Assignee: GHSP, Inc., Holland, MI (US)

(*) Notice: Subject to any disclaimer, the term of this patent is extended or adjusted under 35 U.S.C. 154(b) by 225 days.

(21) Appl. No.: 16/610,968

(22) PCT Filed: May 23, 2018

(86) PCT No.: PCT/US2018/034123
§ 371 (c)(1),
(2) Date: Nov. 5, 2019

(87) PCT Pub. No.: WO2018/217886
PCT Pub. Date: Nov. 29, 2018

(65) Prior Publication Data
US 2020/0166123 A1  May 28, 2020

Related U.S. Application Data

(60) Provisional application No. 62/510,431, filed on May 24, 2017.

(51) Int. Cl.
*F16H 59/10* (2006.01)
*F16H 61/24* (2006.01)
*F16H 59/08* (2006.01)

(52) U.S. Cl.
CPC .............. *F16H 59/10* (2013.01); *F16H 61/24* (2013.01); *F16H 2059/081* (2013.01); *F16H 2061/243* (2013.01); *F16H 2061/247* (2013.01)

(58) Field of Classification Search
CPC .... F16H 59/10; F16H 2059/081; F16H 61/24; F16H 2061/243; F16H 2061/245; F16H 2061/247
(Continued)

(56) References Cited

U.S. PATENT DOCUMENTS

2013/0025397 A1   1/2013 Choi
2014/0283640 A1   9/2014 Neelappa
(Continued)

FOREIGN PATENT DOCUMENTS

DE   102011012105         8/2012
DE   102013214958 A1 *   2/2015  ............. F16H 63/38
(Continued)

*Primary Examiner* — Jake Cook
*Assistant Examiner* — T. Scott Fix
(74) *Attorney, Agent, or Firm* — Price Heneveld LLP (57) ABSTRACT

A selector apparatus comprises a shift lever operably supported on a base for movement between gear positions, and a feel positioner mechanism with offset detent members, where a first detent engages first undulations for biasing the shift lever toward a center of a selected gear position from a first direction, and a second detent engages second undulations for biasing the selector lever toward the center of the selected gear position from a different second direction to the common center point. By the arrangement, the first and second undulations define opposing angled slopes toward the common center point. This allows the undulations to be designed to provide any desired level of biasing force toward the center point without the limitations of a single undulation defining the center point.

20 Claims, 3 Drawing Sheets

(58) Field of Classification Search
USPC .......................................................... 74/335
See application file for complete search history.

(56) References Cited

U.S. PATENT DOCUMENTS

| | | | | |
|---|---|---|---|---|
| 2017/0175883 A1* | 6/2017 | Watanabe | ............... | F16H 61/22 |
| 2018/0209537 A1* | 7/2018 | Kitada | ................ | B63H 21/213 |
| 2018/0320780 A1* | 11/2018 | Heo | .................... | F16H 57/0006 |
| 2020/0166122 A1* | 5/2020 | Yamamoto | ............. | F16H 63/40 |

FOREIGN PATENT DOCUMENTS

| | | | | |
|---|---|---|---|---|
| EP | 0985859 | | 3/2000 | |
| EP | 2172674 | | 4/2010 | |
| EP | 2815287 | | 12/2014 | |
| EP | 3080486 | | 10/2016 | |
| EP | 3106716 A2 * | | 12/2016 | ........... F16H 59/105 |
| GB | 1386252 A * | | 3/1975 | ............. F16H 59/04 |
| RU | 2170679 | | 7/2001 | |
| RU | 2551786 | | 5/2015 | |
| WO | 2017049051 | | 3/2017 | |

\* cited by examiner

TRANSMISSION SHIFTER WITH IMPROVED FEEL POSITIONER

FIELD OF THE DEVICE

The present invention relates to a vehicle transmission position selector with feel positioner constructed to reduce or eliminate noise and lash at and between selector positions.

BACKGROUND

Vehicle transmission shifters typically include a feel positioner mechanism that lets the vehicle driver "feel" that the transmission shifter has reached a selected gear shift position, such as park, reverse, neutral or drive. Traditional feel positioner mechanisms have done this by providing a detent that rides over an undulated surface, with depressions in the undulation matching center points of the gear shift positions. However, a problem is that this results in conflicting shifter requirements on noise, looseness (often called "lash"), and smooth shifting as the shifter moves to and through each of the gear shift positions. For example, since the depressions each comprise an upwardly open arc that facilitates entry and exit of the feel positioner's detent as it slides to and from the center point of the selected shift position, there is a natural lash of the shifter when immediately adjacent either side of the selected shift position as the detent begins to exit a bottom of a selected undulation (i.e., its center point) up a slope of the associated undulated surface. In conventional shifters, the motivation to decrease noise has resulted in an increased lash within the shifter. It has been difficult to eliminate this lash, since additional forces on the feel positioner mechanism can undesirably and adversely affect smooth shifter movement, and can also lead to excessive and undesired level of noise as the feel positioner "snaps" (or clicks) as the shift lever moves into a detented position. Also, lash and/or noise tend to increase over time due to wear and shifting of components in the shifter.

It is desired to provide a feel positioner mechanism that overcomes or better controls lash in vehicle transmission shifters, and to provide a feel positioner mechanism that is flexible in design, yet that has relatively few parts, low cost of parts, low cost of assembly, and that utilizes known technologies.

SUMMARY OF THE PRESENT INVENTION

In one aspect of the present invention, a selector apparatus comprises a base; a selector operably supported on the base for movement between gear positions including park, reverse, neutral, and drive; and a feel positioner mechanism operating on the selector. The feel positioner mechanism includes first and second undulations both defining a common center point for at least one of the gear positions but defining opposing slopes angled toward the common center point. The feel positioner mechanism further includes first and second detents biased against the first and second undulation, respectively, with the first detent operably engaging the first undulation including engaging the associated slope and biasing the selector toward the common center point from a first direction with a first centering force, and with the second detent operably engaging the second undulation including engaging the associated slope and biasing the selector toward the common center point from a second direction with a second centering force, the first and second centering forces combining to eliminate lash from the selector when in the selected one gear position.

In another aspect of the present invention, a selector apparatus comprises a shift lever operably supported on a base for movement between gear positions, and a feel positioner mechanism with offset detent members. The offset and separated detent members include a first detent that engages first undulations for biasing the shift lever toward a center of a selected gear position from a first direction with a first biasing force, and a second detent that engages second undulations for biasing the selector lever toward the center of the selected gear position from a different second direction to the common center point with a second biasing force. The first and second undulations define opposing angled slopes toward the common center point that provide a desired level of biasing force toward the center point from both the first and second directions without a lash-permitting zone between the first and second biasing forces.

In another aspect of the present invention, a selector apparatus includes a base. A selector is operably supported on the base for movement between a plurality of gear positions. A positioning mechanism is cooperatively defined between the base and the selector. The positioning mechanism comprises first and second shifting paths that cooperatively define the plurality of gear positions. First and second detents are biased to an engaged position, the first and second detents slidably engaging the first and second shifting paths, respectively. Operation of the selector slidably operates the opposing first and second shifting paths relative to the first and second detents. Each gear position of the plurality of gear positions is defined by the first shifting path biasing the first detent toward a first direction and the second shifting path biasing the second detent toward a second direction that opposes the first direction.

In another aspect of the present invention, a selector apparatus includes a base. A selector is operably supported on the base for movement between a plurality of gear positions. A positioning mechanism is cooperatively defined between the base and the selector. The positioning mechanism includes an undulating portion having first and second undulating paths that cooperatively define the plurality of gear positions. First and second detents slidably engage the first and second undulating paths, respectively. Each gear position of the plurality of gear positions is defined by the first undulating path biasing the first detent toward a first direction and the second undulating path biasing the second detent toward a second direction that opposes the first direction.

In another aspect of the present invention, a selector apparatus for a vehicle includes a detent assembly having independently operable first and second follower portions. A cam surface cooperates with the detent assembly to define a plurality of gear positions. Each gear position is characterized by the cam surface biasing the first and second follower portions in opposing and respective first and second directions.

An object of the present invention is to provide a flexible design that reduces noise without increasing lash within the selector when moved in and out of a selected gear position, yet that utilizes few parts, low cost parts, provides low cost assembly, and that uses generally known or similar technologies for feel positioning of a shift lever.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
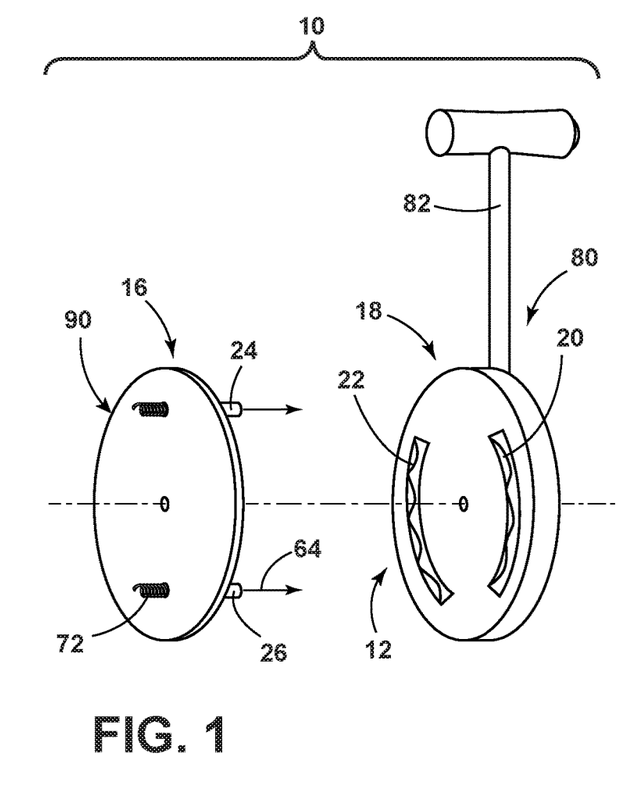
FIG. 1 is an exploded perspective view of a shifter apparatus incorporating an aspect of the shifter positioning mechanism.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-9, reference numeral 10 generally refers to a selector positioning mechanism that incorporates a feel positioner mechanism 12 for smoothly transitioning between various selector positions or gear positions 14 of a vehicle. According to various aspects of the device, the selector positioning mechanism 10 can include a base 16 and a selector 18 that is operably supported or otherwise mounted for rotation on the base 16 for movement between a plurality of gear positions 14. The selector positioning mechanism 10 is cooperatively defined between the base 16 and a selector 18. The selector positioning mechanism 10 includes a cam surface having first and second shifting paths 20, 22 that cooperatively define the plurality of gear positions 14. The selector positioning mechanism 10 also includes at least one detent assembly, typically in the form of first and second detents 24, 26, or other similar followers, that are biased to an engaged position 32 that slidably engages the first and second shifting paths 20, 22. The first and second detents 24, 26 slidably engage the first and second shifting paths 20, 22, respectively. Operation of the selector 18 slidably operates the opposing first and second shifting paths 20, 22 relative to the first and second detents 24, 26. In this manner, each gear position 14 of the plurality of gear positions 14 is defined by the first shifting path 20 biasing the first detent 24 toward a first direction 28 and the second shifting path 22 biasing the second detent 26 toward a second direction 30 that opposes the first direction 28. Using the first and second shifting paths 20, 22 and the first and second detents 24, 26, each gear position 14 is defined by opposing biasing forces that locate the selector 18 in a particular position with respect to the base 16.

As exemplified in FIGS. 1-7, the first and second shifting paths 20, 22 can include undulating paths 40 that include various sloped portions 42. The sloped portions 42 of the first and second shifting paths 20, 22 cooperate to bias the follower portions in the form of the first and second detents 24, 26 in the opposing first and second directions 28, 30, respectively. Accordingly, in a particular gear position 14, the first detent 24 is biased toward the first direction 28 by a corresponding sloped portion 42 of the first shifting path 20. Contemporaneously, the second detent 26 is biased by a sloped portion 42 of the second shifting path 22 toward the second direction 30. These opposing biasing forces 64, exerted in the opposing first and second directions 28, 30, and generated by the sloped portions 42 of the first and second shifting paths 20, 22, effectively create precisely located gear positions 14 of the selector 18 relative to the base 16. These accurate and precise gear positions 14 can be generated by using the undulating paths 40 of the first and second shifting paths 20, 22 that include sloped portions 42 that are typically spaced apart at frequencies 44 that greatly exceed the thickness 46 of the first and second detents 24, 26. This spacing of the frequencies 44 and the thickness 46 of the first and second detents 24, 26 creates a single point of contact between the first detent 24 and the first shifting path 20 and a separate single point of contact between the second detent 26 and the second shifting path 22.

As exemplified in FIGS. 3-6, the sloped portions 42 formed by the undulating paths 40 of the first and second shifting paths 20, 22 are cooperatively arranged so that the first and second shifting paths 20, 22 create alternating undulations of the sloped portions 42. By alternating the undulations and sloped portions 42 of the first and second shifting paths 20, 22, the first and second shifting paths 20, 22, while spaced apart, act cooperatively to form the precise gear positions 14 for the selector 18.

Figure 7:
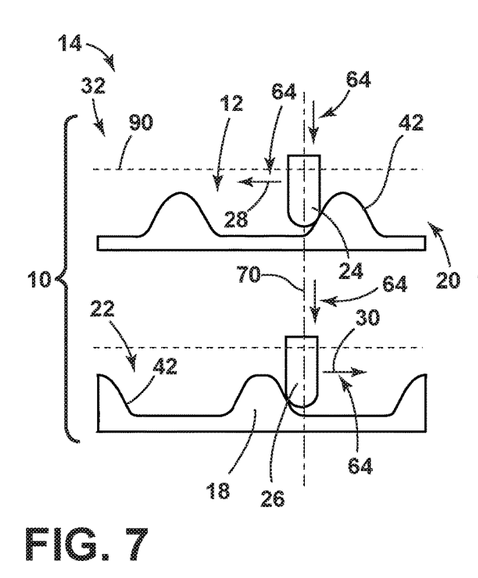
FIG. 7 is a third gear position of the shift positioning mechanism.
Figure 8:
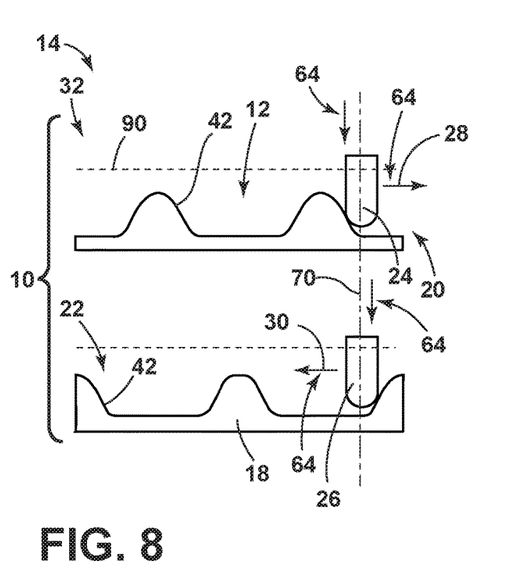
FIG. 8 is a fourth gear position of the shift positioning mechanism.
Figure 9:
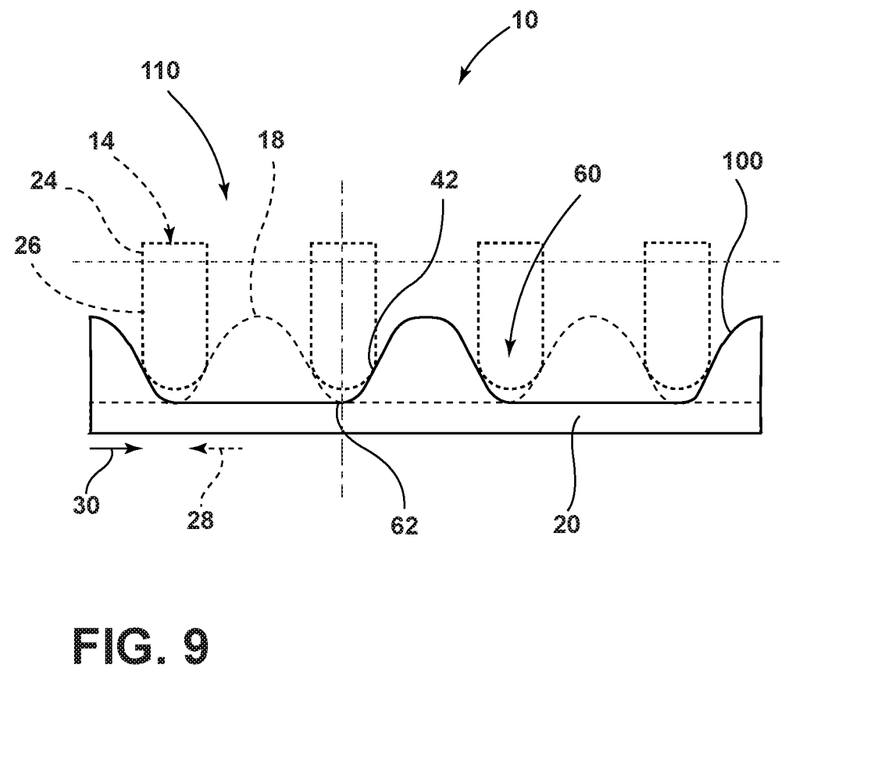
FIG. 9 is a schematic diagram illustrating an overlay of the first and second shifting paths of the shift positioning mechanism for cooperatively defining a gear position of the shifter.

According to various aspects of the device, as exemplified in FIG. 7, the cooperation of the first and second shifting paths 20, 22 can form half depressions 60 that are defined by opposing sloped portions 42 of the first and second shifting paths 20, 22. Each of the half depressions 60 is defined by a sloped portion 42 of the first shifting path 20 that is angled toward the common center point 62 or the corresponding gear position 14. The other opposing sloped portion 42 that corresponds to the respective gear position 14 is located on the second shifting path 22. Through this configuration of the first and second shifting paths 20, 22, the opposing sloped portions 42 that are defined across the first and second shifting paths 20, 22 serve to generate the opposing biasing forces 64 that position the selector 18 accurately at the particular gear position 14. This configuration also combines to eliminate or substantially eliminate lash and excessive noise from the selector 18 when in a selected gear position 14 of the plurality of gear positions 14.

According to various aspects of the device, the first and second shifting paths 20, 22 and the first and second detents 24, 26 are positioned on the base 16 and the selector 18. The exact positioning of the first and second shifting paths 20, 22 and the first and second detents 24, 26 can vary depending upon the exact configuration of the particular selector 18. By way of example, and not limitation, the first and second detents 24, 26 can be positioned on the base 16 and the first and second shifting paths 20, 22 can be positioned on a portion of the selector 18. This configuration can also be reversed. It is also contemplated that the selector 18 can include the first detent 24 and the second shifting path 22 and the base 16 can include the second detent 26 and the first shifting path 20.

According to the various aspects of the device, it is contemplated that the first detent 24 is configured to engage the first shifting path 20, typically at a single point or area of contact. Similarly, the second detent 26 is configured to engage the second shifting path 22, typically at a separate single point or area of contact. The first and second detents 24, 26 are typically biased along respective and parallel longitudinal axis 70. The first and second detents 24, 26 can be biased by springs, elastic members, elastic portions of the base 16 and/or the selector 18, and other similar biasing mechanisms 72 that can serve to place the first and second detents 24, 26 in the engaged position 32 with the first and second shifting paths 20, 22, respectively.

Figure 2:
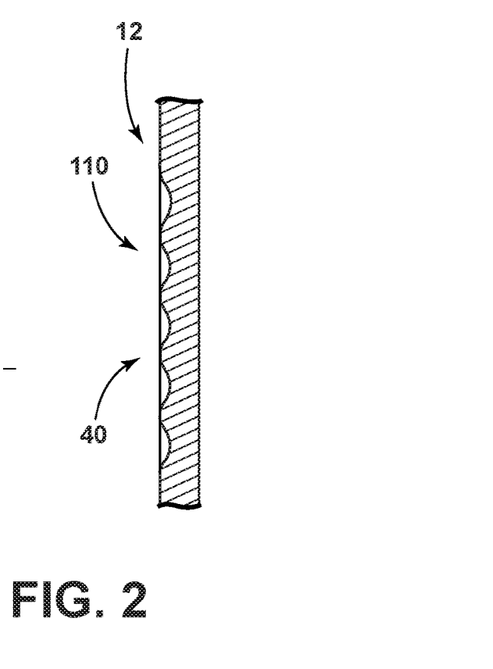
FIG. 2 is a schematic cross-sectional view of the shifting path of FIG. 1.
Figure 3:
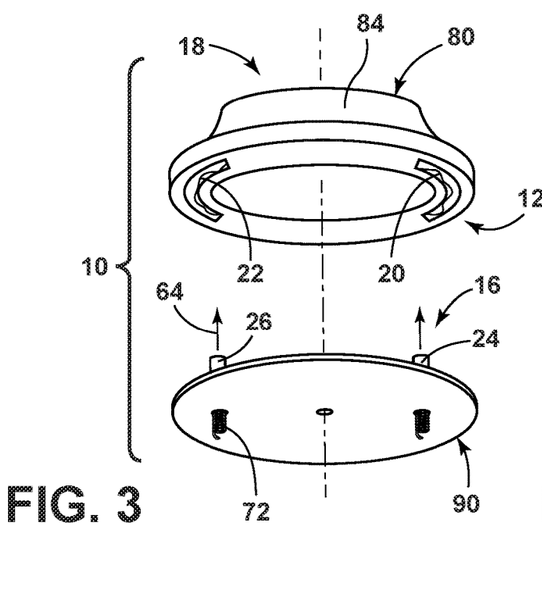
FIG. 3 is an exploded perspective view of a shifter apparatus incorporating an aspect of the shift positioning mechanism.
Figure 4:
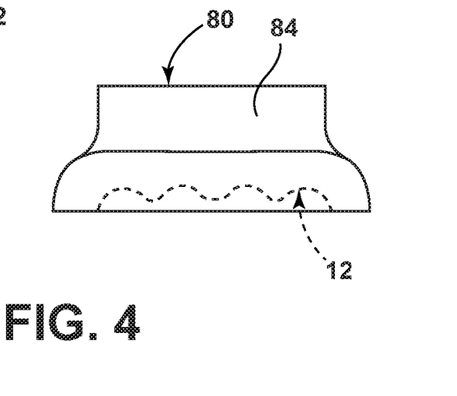
FIG. 4 is an elevational view of the shifter of FIG. 3 showing an aspect of the shifter path.
Figure 5:
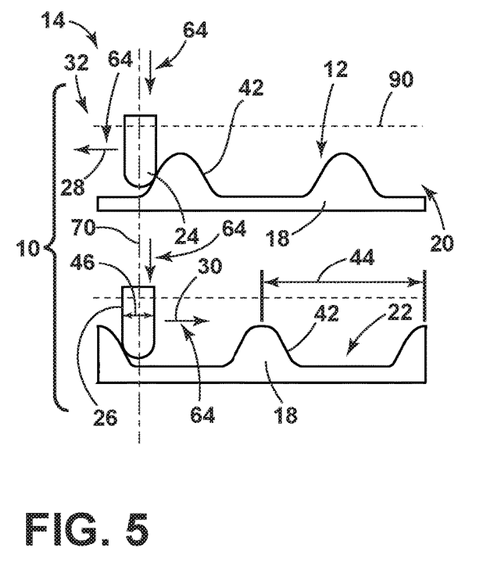
FIG. 5 is a schematic diagram illustrating a first gear position of the shift positioning mechanism.
Figure 6:
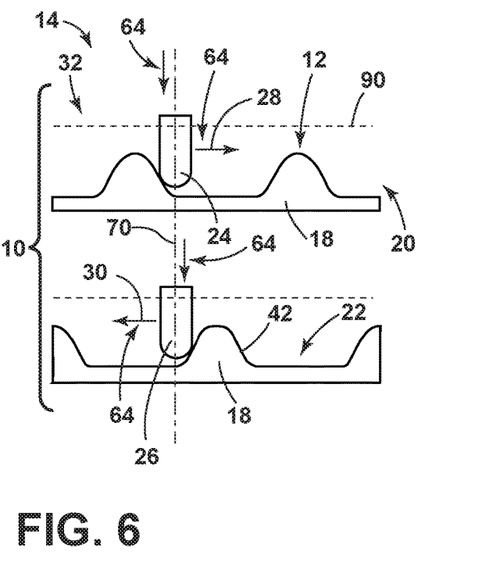
FIG. 6 is a schematic diagram illustrating a second gear position of the shift positioning mechanism.

As exemplified in FIGS. 1 and 2, the selector 18 can be in the form of a radial or rotary shifter 80 having a lever 82, as exemplified in FIG. 1, or a rotating knob 84, as exemplified in FIG. 2. In these configurations, the first and second shifting paths 20, 22 can be arranged to curve concentrically with respect to the selector 18.

According to various aspects of the device, the selector positioning mechanism 10 described herein can also be used within a linearly operable selector 18. In such an embodiment, the first and second shifting paths 20, 22 can be positioned on opposing sides of the linearly operable selector 18 and the first and second detents 24, 26 can be positioned vertically or laterally to engage the first and second shifting paths 20, 22. The first and second detents 24, 26 extend toward the first and second shifting paths 20, 22 along a direction substantially perpendicular to an axis of rotation of the selector 18. Linear operation of the selector 18 can serve to generate the opposing biasing forces 64 for locating the particular gear positions 14 of the selector 18.

As exemplified in FIGS. 1-7, the first and second detents 24, 26 are typically rotationally fixed in relation to each other such that the first and second detents 24, 26 can be biased along the respective and parallel longitudinal axes 70 toward the engaged position 32 that is in contact with the undulating portion 110 that includes the first and second shifting paths 20, 22. Additionally, the first and second detents 24, 26 are typically fixed in relation to a plane 90 that extends normal to the respective and parallel longitudinal axes 70. In this manner, the base 16 is typically a unitary member that includes both the first and second detents 24, 26 and the biasing mechanisms 72 that bias the first and second detents 24, 26 toward the engaged position 32. In this manner, the base 16 can be a bar, disc, plate, or other member that can rotationally fix the first detent 24 with respect to the second detent 26.

Referring again to FIGS. 1-7, the sloped portion 42 of the first and second shifting paths 20, 22 serve to define the plurality of gear positions 14. Each gear position 14 can be defined within various sections of the sloped portions 42 of the first and second shifting paths 20, 22. By way of example, and not limitation, a medial section 100 of corresponding sloped portions 42 of the first and second shifting paths 20, 22 can define a particular shifting position or gear position 14. By locating the gear position 14 within a medial section 100 of the opposing sloped portions 42 of the first and second shifting paths 20, 22, movement of the first and second detents 24, 26 into and out of the particular gear position 14 can be in the form of a generally smooth operation where the first and second detents 24, 26 slidably operate along a generally planar and sloped portion 42 of the first and second shifting paths 20, 22. This configured movement of the first and second detents 24, 26 relative to the first and second shifting paths 20, 22 serves to minimize lash and also minimize noise as the selector 18 moves into and out of the various gear positions 14 of the selector 18.

Referring again to FIGS. 1-7, the vehicle selector 18 can include the base 16 and the selector 18 operably supported on the base 16 for movement between the plurality of gear positions 14. The selector positioning mechanism 10 is cooperatively defined between the base 16 and the selector 18, and includes an undulating portion 110 that includes the undulating first and second shifting paths 20, 22. As discussed previously, the undulating first and second shifting paths 20, 22 cooperatively define the plurality of gear positions 14. The first and second detents 24, 26 slidably engage the undulating first and second shifting paths 20, 22 respectively. Each gear position 14 of the plurality of gear positions 14 is defined by the undulating first shifting path 20 biasing the first detent 24 toward a first direction 28 and the undulating second shifting path 22 biasing the second detent 26 toward a second direction 30 that opposes the first direction 28. The biasing forces 64 exerted in the opposing first and second directions 28, 30 accurately and substantially precisely locates the selector 18 within a particular gear position 14.

Referring again to FIGS. 1-7, the biasing mechanisms 72 of the first and second detents 24, 26 exert linear biasing forces 64 toward the first and second shifting paths 20, 22. In a particular gear position 14, these biasing forces 64 exerted by the first and second detents 24, 26 is substantially equal to one another. When the selector 18 is moved out of a particular gear position 14, one of the detents is compressed into the base 16 and the other detent of the first and second detents 24, 26 extends farther out from the base 16. The detent that is compressed into the base 16 accumulates potential energy and exerts a greater biasing force 64 against the corresponding sloped portion 42 of the first and second shifting paths 20, 22. Necessarily, the magnitude of the biasing force 64 in the corresponding first direction 28 (or second direction 30) is also greater. The other of the first and second detents 24, 26 that has been moved farther away from the base 16 has a decreased potential energy and exerts a lesser biasing force 64 against the respective sloped portion 42 of the first and second shifting paths 20, 22. The magnitude of the biasing force 64 in the corresponding second direction 30 (or first direction 28) is also decreased. Accordingly, when the selector 18 is moved out of a particular gear position 14, the biasing forces 64 exerted by the first and second detents 24, 26 and in the first and second directions 28, 30 becomes unequal. These unequal biasing forces 64 exerted by the first and second detents 24, 26 tends to direct the selector 18 back toward the particular gear position 14. Similarly, when the selector 18 moves toward a separate gear position 14 of the plurality of gear positions 14, the biasing forces 64 exerted by the first and second detents 24, 26 remain unequal until the selector 18 is moved into the particular gear position 14. Again, in the particular gear positions 14, the first and second detents 24, 26 exert similar biasing forces 64 against the respective first and second shifting paths 20, 22 at the sloped portions 42.

According to various aspects of the device, the selector 18 that utilizes the various aspects of the selector positioning mechanism 10 described herein can include a gear selector 18 that moves between the various gear positions 14 that correspond to conventional vehicle transmission gears, such as park, reverse, neutral, drive, low gears, manual shifting positions, and other similar transmission settings. Additionally, the selector 18 utilizing the selector positioning mechanism 10 described herein can include a selector 18 that transitions the vehicle between various drive settings. Such settings can include, but are not limited to, winter driving setting, sand driving setting, uphill or downhill driving settings, and other similar settings that relate to a particular driving condition or driving environment surrounding the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A selector apparatus for a vehicle, the selector apparatus comprising:
   a base;
   a selector operably supported on the base for movement between a plurality of gear positions;
   a positioning mechanism cooperatively defined between the base and the selector, the positioning mechanism comprising:
      first and second shifting paths that cooperatively define the plurality of gear positions,
      first and second detents that are biased to an engaged position, the first and second detents slidably engaging the first and second shifting paths, respectively, wherein
         operation of the selector slidably operates the opposing first and second shifting paths relative to the first and second detents; and
         each gear position of the plurality of gear positions is defined by the first shifting path biasing the first detent only toward a first direction that is perpendicular to a longitudinal axis of the first detent and the second shifting path biasing the second detent only toward a second direction that opposes the first direction.

2. The selector apparatus of claim 1, wherein the first and second shifting paths are undulating paths that include sloped portions.

3. The selector apparatus of claim 2, wherein the sloped portions of the first and second shifting paths cooperate to bias the first and second detents in the opposing first and second directions, respectively.

4. The selector apparatus of claim 2, wherein the first shifting path is disposed on the selector and the first detent is disposed on the base.

5. The selector apparatus of claim 2, wherein the first and second shifting paths are rotationally operable relative to the first and second detents.

6. The selector apparatus of claim 2, wherein the sloped portions of the first and second shifting paths define the plurality of gear positions, wherein each shifting position is defined within a medial section of corresponding sloped portions of the first and second shifting paths.

7. The selector apparatus of claim 1, wherein the first and second detents are biased to the engaged position by springs disposed within the base.

8. A selector apparatus for a vehicle, the selector apparatus comprising:
   a base;
   a selector operably supported on the base for movement between a plurality of gear positions;
   a positioning mechanism cooperatively defined between the base and the selector, the positioning mechanism comprising:
      an undulating portion having first and second undulating paths that cooperatively define the plurality of gear positions,
      first and second detents that slidably engage the first and second undulating paths, respectively, wherein each gear position of the plurality of gear positions is defined by the first undulating path biasing the first detent only toward a first direction that is perpendicular to a longitudinal axis of the first detent and the second undulating path biasing the second detent only toward a second direction that opposes the first direction.

9. The selector apparatus of claim 8, wherein the first and second undulating paths cooperate to bias the first and second detents in the opposing first and second directions, respectively.

10. The selector apparatus of claim 8, wherein the first and second detents are biased along respective and parallel longitudinal axes toward an engaged position that is in contact with the undulating portion.

11. The selector apparatus of claim 10, wherein the first and second detents are fixed in relation to a plane that extends normal to the respective and parallel longitudinal axes.

12. The selector apparatus of claim 8, wherein the first undulating path is disposed on the selector and the first detent is disposed on the base.

13. The selector apparatus of claim 8, wherein sloped portions of the first and second undulating paths define the plurality of gear positions, wherein each shifting position is defined within a medial section of corresponding sloped portions of the first and second undulating paths.

14. The selector apparatus of claim 8, wherein the selector is a linearly operable shifter.

15. A selector apparatus for a vehicle, the selector apparatus comprising:
   a base;
   a shifter operably supported on the base for movement between gear positions including park, reverse, neutral, and drive;
   a feel positioner mechanism operating on the shifter, the feel positioner mechanism including first and second undulations both defining a common center point for at least one of the gear positions but defining opposing slopes angled toward the common center point;
   the feel positioner mechanism further including first and second detents biased against the first and second undulations, respectively, with the first detent operably engaging the first undulation including engaging the associated slope and biasing the shifter toward the common center point from only on a first direction with a first centering force that is directed perpendicular to a longitudinal axis of the first detent, and with the second detent operably engaging the second undulation including engaging the associated slope and biasing the shifter toward the common center point from only a second direction with a second centering force that is directed perpendicular to a longitudinal axis of the second detent, the first and second centering forces combining to eliminate lash from the shifter when in a selected gear position of the gear positions.

16. The selector apparatus of claim 15, wherein the first and second undulations cooperate to define the common center point of the selected gear position.

17. The selector apparatus of claim 15, wherein the shifter is mounted for rotation on the base about an axis, and the first and second undulations are positioned at offset positions around the axis.

18. The selector apparatus of claim 15, further comprising:
- first and second surfaces that include the first and second undulations and further include additional undulations; the first, second and additional undulations defining the gear positions park, reverse, neutral and drive.

19. The selector apparatus of claim 15, wherein the shifter is mounted for rotation on the base about an axis, and the first and second detents engage the first and second undulations along a direction parallel to the axis.

20. The selector apparatus of claim 15, wherein the shifter is mounted for rotation on the base about an axis, and the first and second detents extend toward the first and second undulations along a direction parallel with the axis; and
- wherein the first and second detents are spring-biased and include a detent member that slidingly engages the first and second undulations.

\* \* \* \* \*

UNITED STATES PATENT AND TRADEMARK OFFICE
CERTIFICATE OF CORRECTION

| | | |
|---|---|---|
| PATENT NO. | : 11,280,400 B2 | Page 1 of 1 |
| APPLICATION NO. | : 16/610968 | |
| DATED | : March 22, 2022 | |
| INVENTOR(S) | : John Thomas Bagley | |

It is certified that error appears in the above-identified patent and that said Letters Patent is hereby corrected as shown below:

In the Claims

<u>Column 8</u>
Claim 15, Line 57, after "only" delete "on".

Signed and Sealed this
Thirteenth Day of September, 2022

Katherine Kelly Vidal
*Director of the United States Patent and Trademark Office*